US011500946B2

(12) United States Patent
Balz

(10) Patent No.: US 11,500,946 B2
(45) Date of Patent: *Nov. 15, 2022

(54) APPARATUS FOR PROVIDING BROWSING CAPABILITY BETWEEN REMOTE/VIRTUAL WINDOWS AND FROM REMOTE/VIRTUAL WINDOWS TO CONVENTIONAL HYPERTEXT DOCUMENTS

(71) Applicant: Christopher Mark Balz, Palo Alto, CA (US)

(72) Inventor: Christopher Mark Balz, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,756

(22) Filed: Jul. 6, 2020

(65) Prior Publication Data

US 2020/0342038 A1    Oct. 29, 2020

Related U.S. Application Data

(63) Continuation of application No. 16/236,256, filed on Dec. 28, 2018, now Pat. No. 10,740,414, which is a continuation of application No. 14/081,878, filed on Nov. 15, 2013, now Pat. No. 10,216,843.

(60) Provisional application No. 61/775,019, filed on Mar. 8, 2013.

(51) Int. Cl.
| | | |
|---|---|---|
| *G06F 17/00* | (2019.01) | |
| *G06F 16/951* | (2019.01) | |
| *G06F 16/955* | (2019.01) | |
| *G06F 3/0481* | (2022.01) | |

(52) U.S. Cl.
CPC .......... *G06F 16/951* (2019.01); *G06F 3/0481* (2013.01); *G06F 16/9566* (2019.01)

(58) Field of Classification Search
CPC ... G06F 16/951; G06F 16/9566; G06F 3/0481
USPC .................................................. 715/208, 740
See application file for complete search history.

(56) References Cited

U.S. PATENT DOCUMENTS

| | | | |
|---|---|---|---|
| 8,732,749 B2 * | 5/2014 | Hulse .................. H04L 67/38 725/38 |
| 2011/0138295 A1 * | 6/2011 | Momchilov .......... G06F 3/0484 715/740 |
| 2012/0084713 A1 * | 4/2012 | Desai .................... G06F 3/0481 715/788 |
| 2012/0324365 A1 * | 12/2012 | Momchilov ............ H04L 67/42 715/738 |

* cited by examiner

*Primary Examiner* — Stephen S Hong
*Assistant Examiner* — Matthew J Ludwig
(74) *Attorney, Agent, or Firm* — Bryan Fibel

(57) ABSTRACT

Apparatus is described for directing a user's local web browser/web view to refresh the top-level container that is currently displaying the content presented by a remote computer with the new content that a navigational link, within the remote desktop, remote desktop application window, or remote graphical windowing user session, points to. In response to navigation action on a link, the client of a remote graphical computer desktop, remote graphical application window or remote graphical windowing user session is sent a navigation command so that it wholly reloads its top level container with content provided by a destination URL or URI. Such a URL or URI may point to another remote graphical computer desktop, remote application window or remote graphical windowing user session.

19 Claims, 5 Drawing Sheets

APPARATUS FOR PROVIDING BROWSING CAPABILITY BETWEEN REMOTE/VIRTUAL WINDOWS AND FROM REMOTE/VIRTUAL WINDOWS TO CONVENTIONAL HYPERTEXT DOCUMENTS

CROSS REFERENCE TO RELATED APPLICATIONS

This application is a continuation that claims priority from a non provisional U.S. patent application Ser. No. 16/236,256 filed on Dec. 28, 2018, and issued as U.S. Pat. No. 10,740,414. Application Ser. No. 16/236,256 is a continuation that claims priority from a non provisional U.S. patent application Ser. No. 14/081,878 filed on Nov. 15, 2013, and issued as U.S. Pat. No. 10,216,843. Application Ser. No. 14/081,878 is a non-provisional application that claims priority from a provisional U.S. patent application No. 61/775,019 filed on Mar. 8, 2013.

FIELD OF THE INVENTION

Embodiments of the invention generally relate to generating remote desktop environments on a web browser/web view. Specifically, embodiments of the invention relate to directing a user's local web browser/web view to refresh the top-level container that is currently displaying the content presented by the remote computer with the new content that a navigational link, within the remote desktop, remote desktop application window, or remote graphical windowing user session, points to, or to show the new content in a top-level container of a child web browser/web view.

BACKGROUND

There exists remote desktop software that allows a personal computer's desktop environment to be run on one system while being displayed on a separate client device. The client device displays a remotely-presented, virtual, graphical window. It may access a single software application, such as a text editor, file explorer, or computer game; or an entire computer "graphical desktop", such as one sees when a common desktop computer has completely finished booting. Anything that the user accesses through the window displayed by the client device actually runs on the remote computer desktop or window manager. In contrast to both desktop applications as conventionally used and to conventional "Web applications", in this "remote/virtual window" scenario the remote computer supplies almost all the "horsepower" for powering the software. The client uses rather generic logic to merely render the graphical user interface (along with any multi-media such as audio), take user input, take device input (such as geographical positioning coordinates, device orientation, or ambient light level), and relay all of it to the remote computer. The user may browse web content as usual, using hyperlinks, or any other standard navigational elements (generically termed "links") inside these remote/virtual windows.

SUMMARY

Performing navigational action on links within a remote/virtual window traditionally results in successively nested remote/virtual windows. This results in the substantial waste of resources and degradation of performance from the significant amount of processing power and network capacity required for each successive remote/virtual window. Instead, the present invention satisfies the need for a user viewing a remote/virtual window to travel or "surf" between remote/virtual windows similar to how users surf the Web by clicking on links.

In accordance with the teachings of the present invention, apparatus for directing a user's local web browser/web view to refresh the top-level container that is currently displaying the content presented by the remote computer with the new content that a link, within the remote desktop, points to, or to show the new content in a top-level container of a child web browser/web view is provided. The apparatus comprises a server computing device configured to run a Remoting Engine hosting a remote graphical computer desktop, remote graphical application window, or remote graphical windowing user session. A remote graphical computer desktop, remote graphical application window, or remote graphical windowing user session between the client computing device and the server computing device is established, with a client computing device running a Remoting Engine client, where the established remote graphical computer desktop, remote graphical application window, or remote graphical windowing user session is displayed to a user within a top level container of the client web browser/web view. The server apparatus receives a navigation action on a navigation link, which includes a destination URL path or URI path, on the server computing device, by a client browsing the established remote graphical computer desktop, remote graphical application window, or remote graphical windowing user session. In repose to the navigation action, navigation event data is parsed, including a URL or URI, from the link, the navigation event data is passed to the Remoting Engine on the server computing device hosting the remote graphical desktop, remote graphical application window, or remote graphical windowing user session, and a navigation command is sent to the client to reload the top level container of the client web browser/web view with content provided at the destination URL or URI. In addition to a conventional web page, such a URL or URI may point to another remote graphical computer desktop, remote graphical application window, or remote graphical windowing user session.

Another embodiment provides for redirecting the correct client display session when running multiple display sessions on the same remote operating system. Additionally, the client can be directed to load a whole web page context on a child of itself leaving the parent container unaltered by the navigation action, where the child can be a an HTML frame, including an iframe and can be new or preexisting.

BRIEF DESCRIPTION OF THE DRAWINGS

The accompanying drawings taken in conjunction with the detailed description will assist in making the advantages and aspects of the disclosure more apparent.

FIG. 5 is a block diagram showing how navigational action on a pop-out link directs the user's local web browser/web view to refresh the top-level container that is currently directly displaying the content presented by the remote computer with the new content that the link points to.

DETAILED DESCRIPTION

Reference will now be made in detail to the present embodiments discussed herein, illustrated in the accompanying drawings. The embodiments are described below to explain the disclosed apparatus by referring to the Figures using like numerals. It will be nevertheless be understood that no limitation of the scope is thereby intended, such alterations and further modifications in the illustrated device, and such further applications of the principles as illustrated therein being contemplated as would normally occur to one skilled in the art to which the embodiments relate.

Apparatus for directing a user's local web browser/web view to refresh the top-level container that is currently displaying the content presented by the remote computer with the new content that a link, within the remote desktop, remote application window, or remote graphical windowing user session, points to, or to show the new content in a top-level container of a child web browser/web view.

Figure 5:
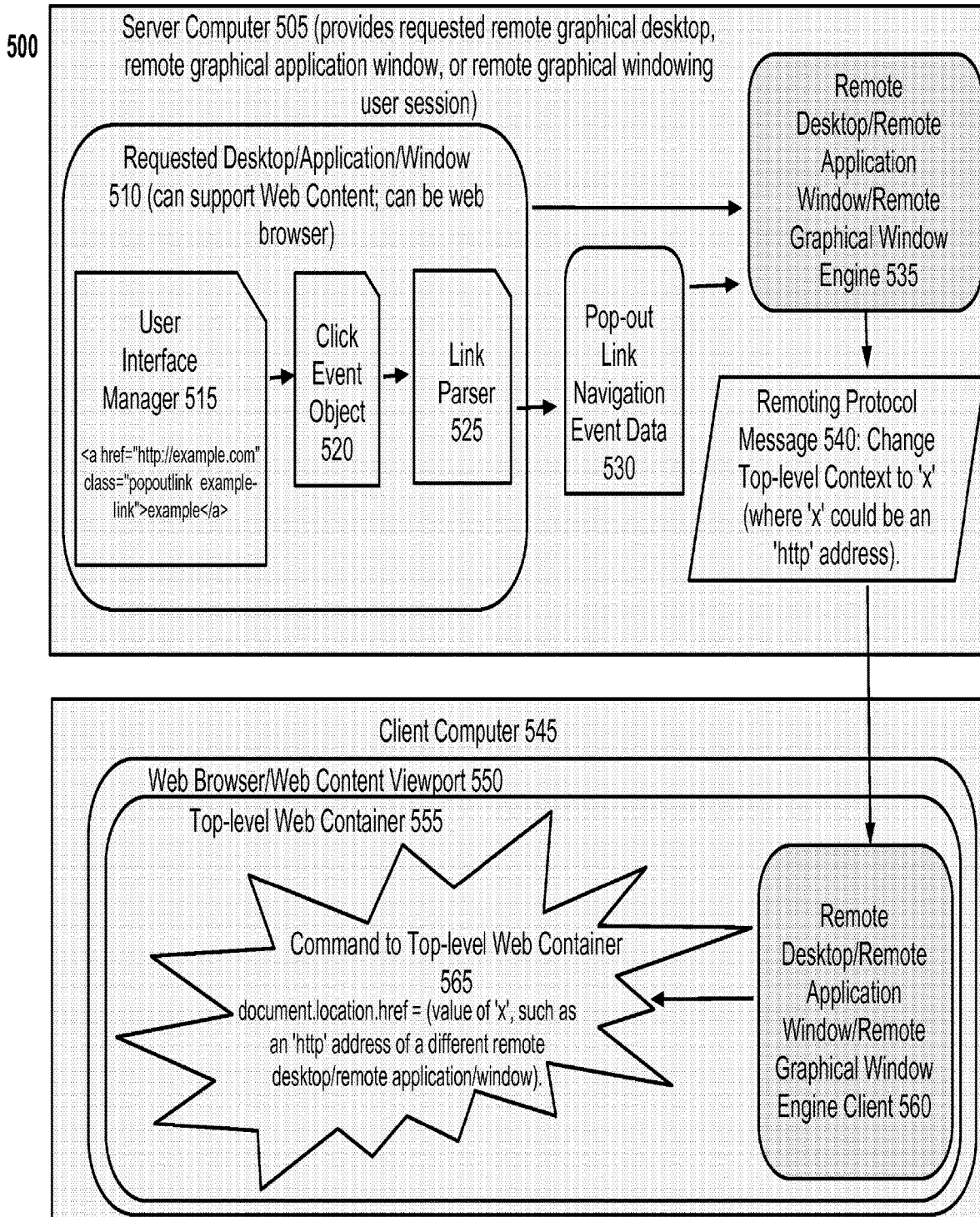

The descriptions of the first four Figures provide a basic, high-level explanation of general embodiments. The description of the last Figure, FIG. 5, provides a more detailed explanation of embodiments.

Figure 1:
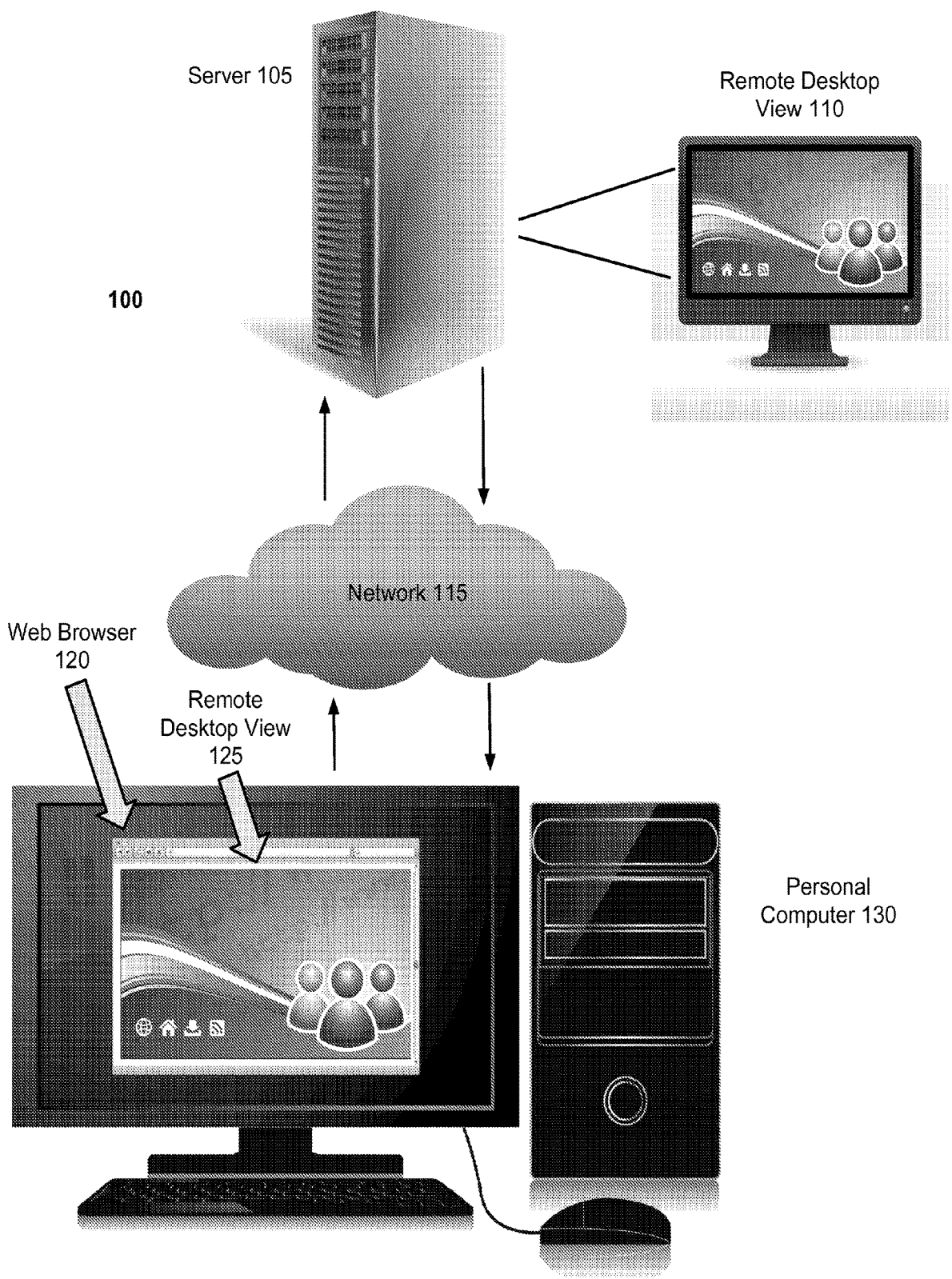
FIG. 1 is a block diagram depicting a remote server, accessible through a network, and providing a view of its graphical desktop to a remote client personal computer on a web browser running on the personal computer.

FIG. 1 is a block diagram depicting a typical client server system 100 where the invention would be used. It consists of a remote server 105, accessible through a network 115 such as the Internet or a local-TCP/IP-based network. The remote server 105 provides a view of its graphical desktop (Remote Desktop View 110), although this could equally be a single application window such as would commonly run upon a graphical computer desktop, or in the most general case, a non-application graphical window, such as a Display Manager program that is not, strictly defined, an application, but presents a graphical window to the user for the purpose of logging into the graphical desktop, upon which run applications. The latter represents an example of what is known in the art as a "graphical windowing user session". The client, Personal Computer 130, accesses this Remote Desktop View 110 via Web Browser 120, which shows Remote Desktop View 125. Remote Desktop View 125 shows the exact same content as Remote Desktop View 110, but runs on the client computer (Personal Computer 130), and not on the server computer (Server 105). The user may interact with the application using the mouse and keyboard shown and/or any other input device. Additional usable client devices 130 include, but are not limited to, smart phones, tablets, connected entertainment devices (such as smart tvs), and wearable/implants (computing devices integrated with the human body but capable of displaying desktops, application windows, or other graphical windows from remote computers so that the wearer or host individual can interact with the display).

Figure 2:
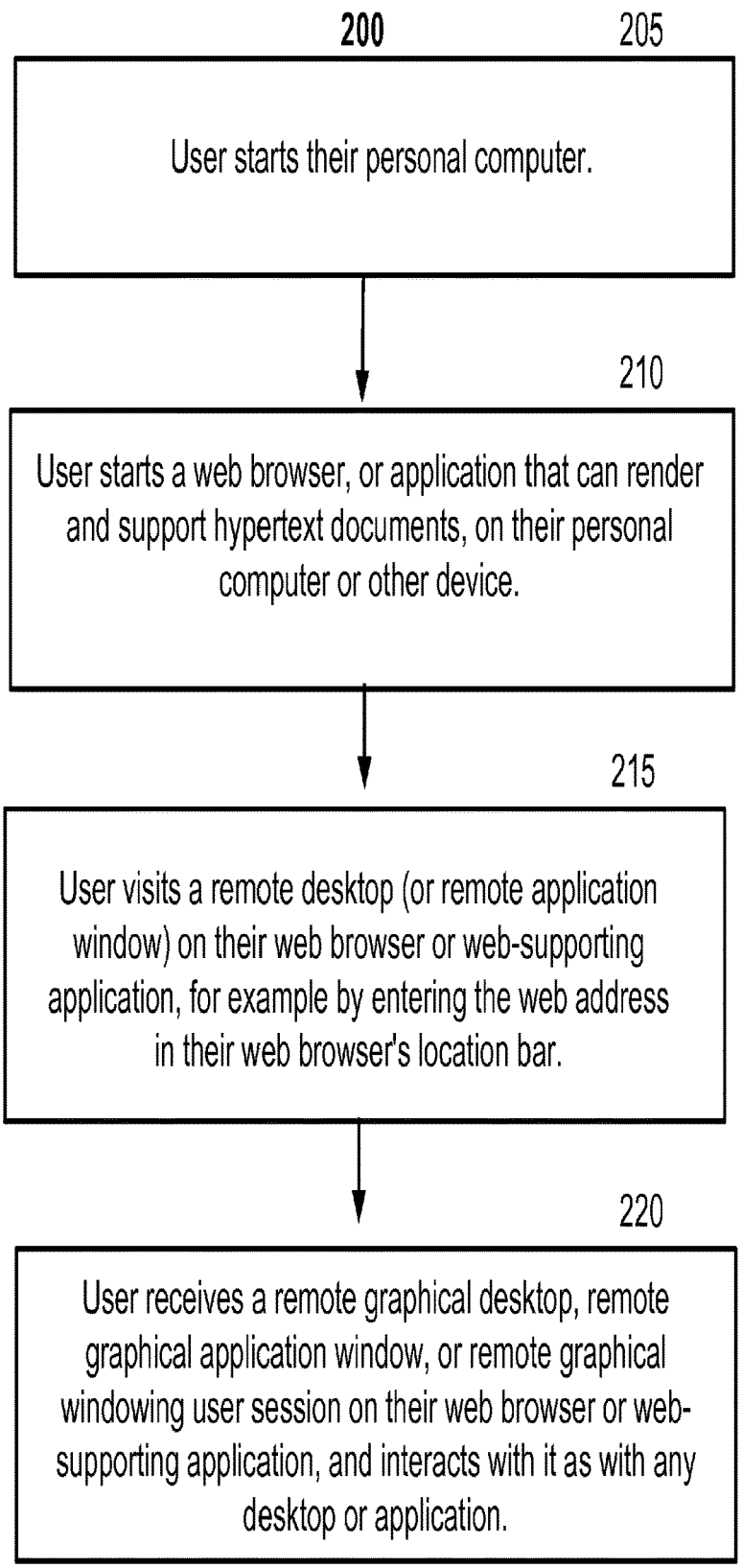
FIG. 2 is a flowchart depicting the basic use case where a user brings up a remote desktop, using technology such as the web browser/web view, where the invention would be deployed.

FIG. 2 is a flowchart showing a process of accessing such remote desktop systems as displayed in FIG. 1.

While interacting with the remote graphical desktop ("remote desktop"), remote graphical application window ("remote application window"), or in the most general case of remotely-hosted graphical windows, a remote graphical windowing user session, a user may click on a hyperlink pointing to another remote graphical desktop, remote application window, or remote graphical windowing user session. The user may also, in the most general case of all navigational targets, click on a hyperlink pointing to a non-remotely-hosted resource such as a conventional web page. Importantly, the hyperlink (represented in HTML as an HTML 'anchor' tag) is merely one example of a possible navigational code element. It is used as an example here because it is the most common, and the original, way of navigating the World Wide Web. However, many other elements, such as the HTML 'button', can be used as navigational elements by linking them to other code that will execute the desired navigational action. For the purposes here, the only important factor is the navigational action of when a user activates the navigational element, usually but not exclusively by clicking.

As conventionally implemented, clicking on links that exist within a remote/virtual window and point to a different remote/virtual window results in successively nested remote/virtual windows. Since each remote/virtual window requires a significant amount of processing power and network capacity to effectuate, this represents a substantial waste of resources and a degradation of performance for the end user. To reach outside of the enclosing remote/virtual window, the user needs a special kind of link that indicates that the resource must be loaded outside the current enclosing remote/virtual window, termed a pop-out link.

Figure 3:
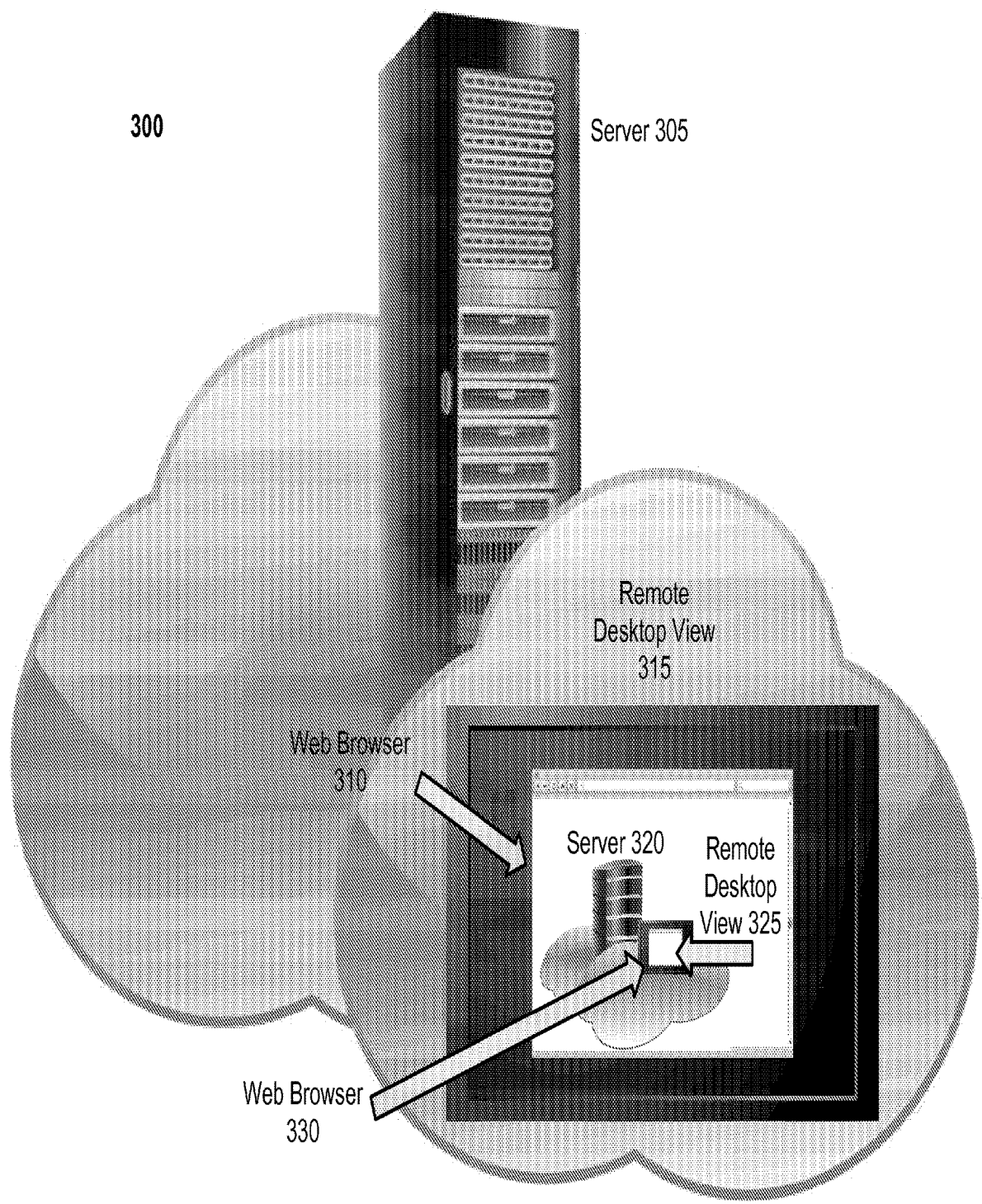
FIG. 3 is a block diagram showing the nesting problem that occurs when a user brings up a remote application in the general manner shown in FIG. 2 and clicks on a link in a remote application running on a remote server not equipped with the present invention.

As illustrated in FIG. 3, a remote graphical computer desktop view 325 that is displayed (via Web Browser 330) inside another remote graphical computer desktop view 315 (displayed via Web Browser 310) defeats the organizing principle of the graphical computer desktop user interface paradigm.

Similarly, a remote computer desktop, or any remote application running on it, could point to a remote application window that is a high-specification computer game on a different server computer and thus encounter the same problem. If that link were followed as conventionally implemented, then the remote server running the computer game would be piping the user interface through the remoting engine of the first server computer. The extraneous layers could be nested to any possible depth, with commensurately increased performance overhead. Nested web browsers illustrate the problem itself clearly. A nested high-specification computer game provides a good example of a clear disadvantage in terms of performance since a high-specification computer game demands a fast-performing computer or computing system, including fast receipt of user input and fast delivery of a response to the user. The basic problem shown here can be reproduced with any remote desktop, application, or graphical windowing user session that provides for navigation to another remote desktop, application, or graphical windowing user session, and the present invention can be applied to such situations.

Figure 4:
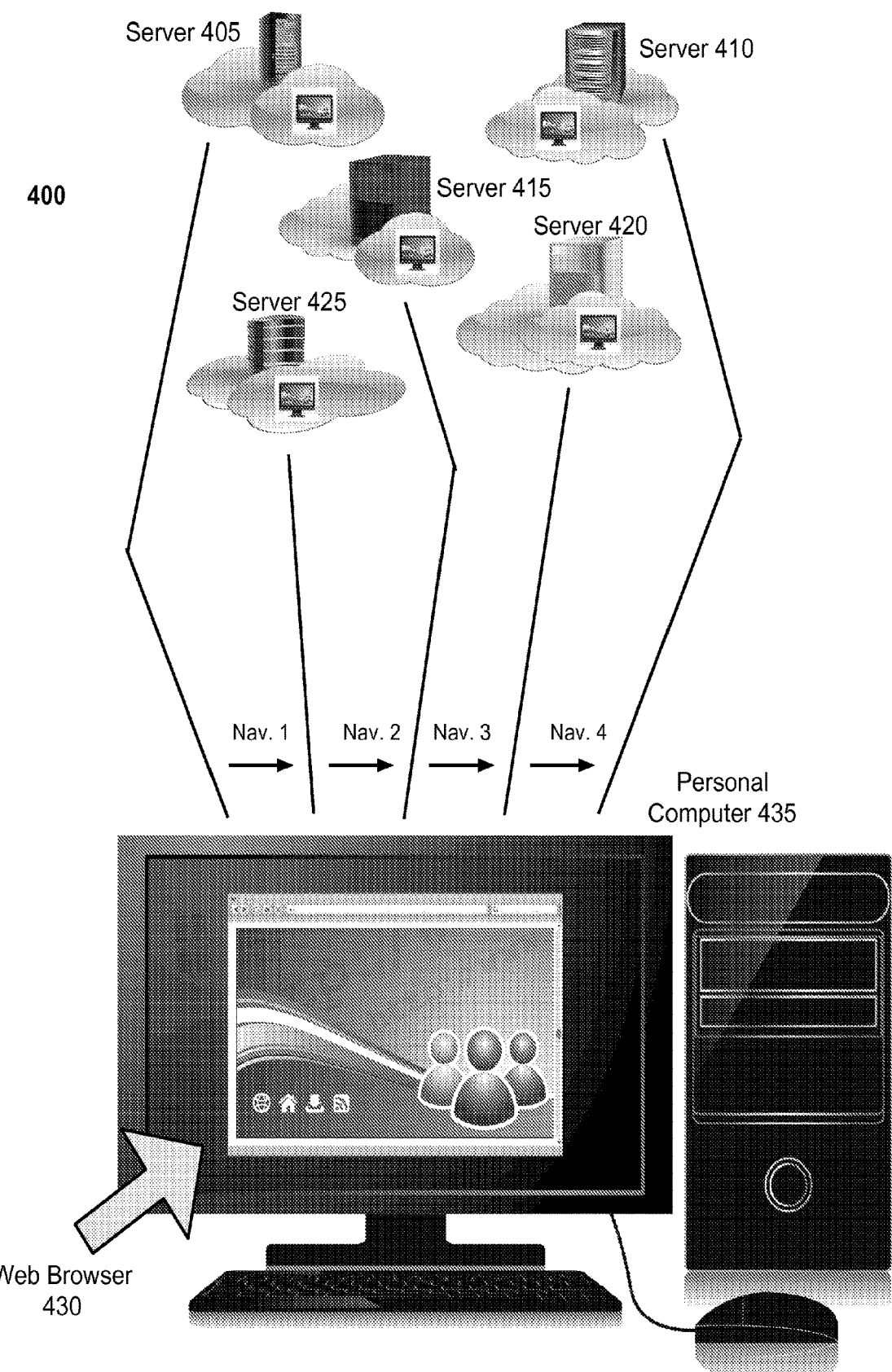
FIG. 4 is a block diagram depicting a plurality of remote servers on a network, each providing their own graphical desktop to remote clients, and a client computer used to "surf" between the remote graphical desktops via the web browser/web view that runs on the client computer.

FIG. 4 depicts the usage 400 of a plurality of remote servers (Server 405, Server 410, Server 415, Server 420, Server 425) on a network such as the Internet or a local-TCP/IP-based network. Each provides their own graphical desktop to remote clients such as Personal Computer 435, although each of these could equally be a single application window such as would commonly run upon a graphical computer desktop, or a graphical windowing user session, such as a Display Manager for allowing a user to log in to a desktop. Importantly, each remote desktop, remote application window, or remote graphical windowing user session may hold the exact same, or similar, or completely different content. A user at the client computer Personal Computer 435 "surfs", using Web Browser 430, between the remote graphical desktops via the web browser, sequentially performing navigation actions 'Nav. 1' through 'Nav. 4' in numerical order, resulting in successively visiting remote servers Server 405 through Server 425, and receiving each remote server's remote desktop or remote application window on the web browser. On the web browser, the user may interact at will with the remote desktop, remote application window, or remote graphical windowing user session using the keyboard and mouse shown, and/or any other input device. Importantly, the user may have any number of web browsers open at any time, and any number of those may be visiting a remote desktop, remote application window, remote graphical windowing user session or a conventional web page hosted by one of the remote servers.

The preferred embodiment of the present invention allows a remote/virtual window (displaying a remote desktop, remote application window, or remote graphical windowing user session) to be replaced with a new one upon the user's click or other equivalent command or action. This would enable a user viewing a remote/virtual window to travel or "surf" between remote/virtual windows similar to how users surf the Web by clicking on links.

As the user surfs from server to server, as illustrated in FIG. 4, each successive remote server serves the content it hosts directly to the client, instead of having to pass through the remote server that was first visited, as shown in FIG. 3. For example, it may be desirable for a user to be able to navigate directly from a remote application window holding an application such as a word processing application to a different remote application window (which could hold a different word processing application) hosted on a different remote server. In that scenario, the optimal behavior is for the different remote application window to be shown directly from the remote server that natively hosts it, and not through the remote application window of the first remote server or a new remote application window that could be spawned from the first remote server.

As illustrated in FIG. 5, this is accomplished by modifying the applications supporting the links to server computers hosting remote desktops, remote application windows, or remote graphical windowing user sessions to support, in addition to their current support of regular hyperlinks (specifically, 'http://' links), other links specially marked so as to be recognizable by the remote machine as pop-out links. For example, a link can be made recognizable as a pop-out link by inserting the custom HTML attribute 'popoutlink' in the html tag 'a' (the 'anchor' tag) as in '<a href="http://example.com" popoutlink>example.com</a>'. Another example would be 'popoutlink://' or a similar construction ('pttp://', and so forth) in place of the 'http://' in the example given above. Yet another example, conformant with versions of HTML prior to HTML 5 that are still in rather common use at the time of this writing, since it avoids the use of a custom HTML attribute, would be '<a href="http://example.com" class="popoutlink">example.com</a>'. In the latter example, "popoutlink" is supplied as the sole CSS 'classname' to the HTML attribute 'class', but it does not have to be the only CSS 'classname' supplied, and the order of 'popoutlink' in the list of CSS classnames supplied to the 'class' attribute is not significant. Another example would be an http 'GET' parameter 'popoutlink', so that the Uniform Resource Locator ("URL") or Uniform Resource Indicator ("URI") of the hyperlink would contain 'popoutlink', such as: "http://example.com?popoutlink&foo=bar" or "http://example.com?foo=bar&popoutlink". This example would be entirely compatible with versions of HTML prior to HTML5 but would pose a slightly additional load upon the server that serves the resource at the URI or URL, and would require any application data identifiers in the list of HTTP GET parameters to not be 'popoutlink' (since that identifier is already used for the purpose explained here). All of the examples cited above have been uniquely modified to qualify as pop-out links.

In the pop-out link annotation embodiment (an http 'GET' parameter 'popoutlink') and the HTTP attribute annotation embodiment ('popoutlink', 'class="popoutlink"'), the pop-out link would function as an ordinary hyperlink when running on a local computer system (one that is not serving remote desktops, remote application windows, or remote graphical windowing user sessions). Links created in this manner will have no effect on a user browsing locally and will only have the functionality of the present invention when a user is browsing remotely, because the navigation action under local use is not subject to the intermediation described below.

When a computer program supporting pop-out links, such as Requested Application 510, encounters a pop-out link navigation action, it alerts the remoting engine (Remote Desktop/Remote Application Window/Remote Graphical Window Engine 535) and passes the URL of the pop-out link (the Web address following the '//' in 'http://' or any of the "pop-out link" equivalents outlined above), along with the value of any other HTML attributes such as 'target', to it. The alerting can be done by use of components that, taken individually, are well-known to those skilled in the art. While the specific implementation may vary depending upon the specific computer languages used by these applications, graphical windowing user sessions, and graphical computer desktops, and while it may vary according to the specific application, a basic approach holds across the variations.

In the preferred embodiment, a standard web application client receives a pop-out link navigation directive from the remote computer and directs the top-level user-interface container that currently holds the content served by the remote computer to the resource specified in the navigation directive. The client can be embodied in client software that generally or strictly conforms to the specifications of a web application as defined by the World Wide Web Consortium, that runs on the end user's local computer on a standard web browser or on a web-enabled application, and that is able to execute by using only building blocks made from technologies defined by the World Wide Web Consortium. This is done without plug-ins to the standard web browser or the web part of the web-enabled application. A "standard web browser" or a "standard web view" is equipped to execute a fairly comprehensive suite of program code for delivering web-based software applications, as defined in reasonably up-to-date specifications from the World Wide Web Consortium. "Web-enabled applications" are applications that can host a "standard web view".

The server part of the preferred embodiment would add to its virtualization engine, such as a Virtual Network Computing" ("VNC") server or a Remote Desktop Protocol ("RDP") server, and possibly to its operating system, the capability of accepting and acting upon pop-out link messages, including the URL's or URI's from pop-out links. Pop-out link-enabled applications that run on the server machine's operating system would be capable of differentiating clicks on pop-out links from clicks on links, and would pass a message to either the operating system or directly to the virtualization engine that a pop-out link has been clicked, with the URL or URI of the pop-out link contained as data of the message. This kind of message is sometimes referred to in the art as an "event". Whether or not the pop-out link message would pass through the operating system and then to the virtualization engine would depend upon the details of the mechanics of the specific type operating system on the server itself. In either case, the virtualization engine will then transmit the pop-out link navigation command to the client, as described in greater detail below.

Therefore, a detailed example of a preferred embodiment follows where one client is using a single remote computer or single remote virtual machine that hosts the remote desktop.

The 'curl' program works on many operating systems and serves the purpose of generating HTTP 'GET' requests and receiving the response to the request, if any. 'curl' takes as input a URL or URI, along with any data to be passed as an HTTP 'GET' parameter set with that URL or URI. Then it issues an HTTP request on the network of the machine it is running upon. The application, Requested Application 510, containing the pop-out link clicked upon by the user, passes the data in the link, Pop-out Link Navigation Event Data 530, as part of an HTTP 'GET' request sent by the 'curl' program. A local HTTP server program can hear HTTP 'GET' requests addressed to it. The remoting engine, Remote Desktop/Remote Application Window/Remote Graphical Window Engine ("remoting engine") 535, can be a program, possibly a Java servlet, running on a local HTTP server. The 'curl' request is addressed to this program. Therefore, the 'GET' request notifies the remoting engine 535, alerting the remoting engine to the need to serve a pop-out link.

To state the above in greater detail: When the application invokes the 'curl' program, it passes (via mechanisms such as Click Event Object 520 and Link Parser 525, detailed below) the data contained in the HTML 'a' element, shown for example in User Interface Manager 515, as an argument to 'curl'. 'curl' then executes the HTTP 'GET' request. The remoting engine 535 supports a facility, which in this case is a Java servlet container, for receiving HTTP 'GET' requests. The 'curl' program is invoked as a stand-alone program on the operating system shell, and it receives the values of the HTML attributes on the pop-out link, including the value of the 'href' attribute that holds the URL or equivalent and other attribute values, such as 'target'.

Alternative embodiments could use a system daemon instead of a stand-alone program such as 'curl'. A daemon would offer the advantage of fastest response time, as a daemon stands at the ready to take any requests, whereas a stand-alone program requires a new operating system-level process to be created and allocated to it each time it is executed.

However, since the current use-case entails a human user manually clicking on a link in a document on a desktop or remote application window assigned for their user session to their client device alone, the time savings offered by the daemon would not be significant. Additionally, a daemon requires extra system administration setup time compared to the equivalent stand-alone program. It is likely that a daemon would be desirable in specialized circumstances, such as a scenario where a single remote desktop or remote application window would receive many such clicks or the equivalent per second.

An application, which can be written in 'C++', a superset of the 'C' computer language, receives a pop-out link as a data property of an event object, a block of computer memory containing values related to an event, such as a user clicking on a link or pop-out link. The event object, Click Event Object 520, was generated by standard application code (supported by User Interface Manager 515) that runs whenever a user clicks on a link, and loaded by that code with values about the event, such as the HTML attributes existing on the link or pop-out link that was clicked. The application code that creates the event is itself triggered by an event as provided by the 'C' computer language, a subset of C++ that is available to C++ programs.

The event object is passed to a segment of software code known as an "event handler". This event handler, commonly found in the "view" portion of the code of a typical application such as one based on the model-view-controller or model-view-presentation architecture, may need to be modified to support pop-out links. In the case of a typical word-processing program, the event handler will pass the entire URI or URL to a program method called, for example, LoadNavigationTarget, located in a C++ program file.

Because the URL or URI in this program method's signature, for the present example, is of a custom string type 'rtl::NavString&', it lacks the standard 'c_str' method, which is needed for convenient processing of the string. Therefore, it can be converted to a standard C++ string 'url' (below) with the following code, which can be located in an external utility program or library, where 'rNavTarget' is the 'rtl::NavString&' type value:

```
std::string url;
std::stringstream
ss(std::stringstream::in|std::stringstream::out);
ss << rNavTarget;
ss >> url;
```

In the embodiments where a pop-out link identified via an HTTP 'GET' parameter or a protocol identifier is used, the URL or URI can be inspected in the 'LoadNavigationTarget' method by calling a C++ standard template library ("STL") method named 'contains' to search the URL for the presence of '?popoutlink', '&popoutlink', 'pttp://', or 'popoutlink://', or the equivalent. If one of the pop-out link identifying labels are found, then the navigation is that of a pop-out link.

If the other embodiments that rely upon the non-'href' attributes of the HTML 'a' tag are to be used, then the attributes will need to be extracted and examined. This would most commonly be done in the event handler. Some programs may provide the values of the attributes to a method similar to 'LoadNavigationTarget'. In that case, the values would be searched, or marshalled for search, in that program method. In any of the possible embodiments, if an HTML attribute meets the conditions set out above, the application logic would know that a pop-out link was clicked upon.

To implement the Link Parser 525, a separate C++ class can be made to bundle the required functionality. This class could be called "curlit" (from "curl"+"it") and it would provide a method called 'is_executable' that, in an embodiment that supported only a single pop-out link identifier such as the full 'popoutlink' identifier, may look like:

```
bool curlit::is_executable( ) {
return contains(m_popoutlink,m_attributes);
}
```

In the embodiment above, the 'm_popoutlink' is a private string representation of the pop-out link identifier ('popoutlink'), and 'm_attributes' contains the stringified form of all the values of all the HTML anchor attributes gatherable by the separate calling program's 'LoadURL' method. The C++ STL 'contains' method, supplied with the pop-out link search parameters, searches the attributes and returns a boolean value indicating the presence or absence of a pop-out link.

Example code to create a "curlit" instance in the client program may look like:

```
try {
curlit c(url);
if (c.is_executable( ))
c.execute( );
else
::_LoadNavigationTarget(. . . );   // Where '. . . ' represent the
arguments to the
'_LoadNavigationTarget' method in the specific implementatidson.
'rNavigationTarget would be among these, and is the only one directly
relevant.
}
catch ( curlit_exception& ex ) {
cout << ex.what( ) << endl;
}
```

The above implementation provides error handling with a try-catch block. Errors that must be handled include improperly supplied input, such as an invalid string representation of what should rather be a correct HTML 'a' element with its content. Error checking can be done by means of C++ STL methods such as 'split', in order to break down the contents of a string representing the HTML 'a' element for individual checking. For example, if there is nothing following 'http://', then that invalidates the 'a' element and an exception must be thrown and caught.

The above implementation checks to see if the link represents a pop-out link by using the method, 'is_executable'. If the link is not a pop-out link, the original program method for executing hyperlinks is executed, which in our example, would be renamed in the source code to "_LoadNavigationTarget" from its original name, 'LoadNavigationTarget', in order to avoid a naming conflict with our added implementation, which would take the original name, 'LoadNavigationTarget'.

If the link does represent a pop-out link, the present example embodiment runs the 'execute' method which may look like:

```
int curlit::execute( ) /* throws notexecutable_exception( ); */ {
if( !is_executable( ) )
throw notexecutable_exception( );
string curl = execute_string( );
int code = system( curl.c_str( ) );
return code;
}
```

The above code calls a program method that composes the proper string required for the call to the standard C++ 'system' function. The 'system' function allows the C++ program to run a program on the base system, otherwise known as the operating system or more specifically the "shell" of the operating system ("the shell"). The shell provides the context in which the "curl" program can be started and can execute. The 'return' statement above provides the shell's exit status code for the 'curl' invocation to the calling program.

The 'execute_string' method may look like:

```
curlit::execute_string( ) {
string s = "curl --get";
if ( m_data.size( )>2 )
s +=" --data "+m_data;
s +=" "+m_url;
return s;
}
```

The above implementation creates a string that will invoke the 'curl' program on the shell, with the correct inputs.

Since the client will ultimately need the HTTP protocol, any 'pttp' or the like would need to be ignored and replaced with 'http'. Similarly, any lack of 'http://' on the URL would be remedied by prepending the default value, 'http://'. These operations can be done using string manipulation methods from the C++ STL library and standard C++ comparison facilities.

Since HTTP 'GET' requests pass data by means of url encoding and the '?', '&', and '=' special characters, the Pop-out Link Navigation Event Data 530 is specified according to that convention: '?href=http://example.com&target=_blank' (where '&target=_blank' is an example of an optional pop-out link attribute and value) and then url-encoded per RFC 3986 of the Internet Engineering Task Force ("IETF"). Thus the string specifying the HTTP 'GET' request, in the present example, looks like: 'http://localhost:8080/handlepopoutlink?href=http%3A%2F%2Fexample.com&target=_blank'.

Therefore, 'm_url' in the implementation above would be 'http://localhost:8080/handlepopoutlink' and 'm_data' would be ?href=http%3A%2F%2Fexample.com&target=_blank'. The URL encoding can be done with the 'curl_escape' method in the 'libcurl' library.

Since the remoting engine 535, in most embodiments, runs on the very same machine as the application that holds the pop-out link, Server Computer 505, the location can be addressed as 'localhost'. In the present embodiment, since the remoting engine 535 is or includes a Java servlet, by default it will listen to 'port' '8080' for incoming HTTP 'GET' requests, so additionally ':8080' is specified. The facility that contains the software code for processing the HTTP 'GET' request exists under a handle, or name (in this case, servlet name) of 'handlepopoutlink', so '/handlepopoutlink' is specified. The assignment of this name can be done in a servlet container's 'web.xml' file.

The remoting engine 535 then inserts a navigation instruction into the communication protocol it uses to communicate with the remoting engine client, Remote Desktop/Remote Application Window/Remote Graphical Window Engine Client 560 ("remoting engine client" 560). As with the alerting of the remoting engine described above, the insertion can be done by use of components that, taken individually, are well-known to those skilled in the art. While the implementation may vary depending upon the specific computer languages used by the operating system, by the type of remoting engine used, and by the toolset supported on the operating system, a basic approach holds across the variations.

In the present embodiment, the 'curl' program has made an HTTP 'GET' request and passed the data in the Pop-out Link Navigation Event Data 530 to the 'handlepopoutlink' servlet that is part of the remoting engine 535. This servlet runs as part of a larger web application (as described in "Java™ Servlet Specification Version 2.4") that is in fact the remoting engine.

Thus it has access to the memory used by the rest of the remoting engine. This means that it can access the tunnel (such as a Unix i/o socket, or a wrapping of such by a higher-level language such as Java) used by the remoting engine to stream out data representing the current desktop/application/graphical windowing user session window to the client. The servlet can also insert a navigation command, Remoting Protocol Message 540, into this data stream.

A servlet receives data from an HTTP 'GET' request and may act upon it. The example 'handlepopoutlink' servlet takes the data passed by the 'curl' program and inserts it into the data stream handled by this tunnel. To do so, it must distinguish the navigation command, Remoting Protocol Message 540, and any related data from other data in the stream sent by the tunnel, such as that representing the pixels on the screen. Typically, a special character string must be inserted that the client software will be programmed to recognize. This character string can be 'follow_popoutlink' and it is a command for the client software Remote Desktop/Remote Application Window/Remote Graphical Window Engine Client 560 ("the client") that runs on Client Computer 545.

Note that in the current example, all data is sent as a character stream, including the video data. In the current example, that data is encoded in base64. Therefore, character strings that are commands for the client software can share a single tunnel to the Client Computer 545 and the client 560.

First, as is common with low-level data buffers written to sockets, the length of the command (in terms of string characters) is inserted into the stream, followed by a delimiter, such as the '.' (dot) character, and then the command itself. Following the command will be the data such as the URL or equivalent and, in the present example, the 'target' attribute and value. For efficient processing of the list of data, the client needs to be told how many pieces of data it will need to gather in order to compose the pop-out link.

The next insertion into the data stream is the length in characters of the number of data pieces, which in this case is two (the 'href' identifier with its value, the href value (URL or URI); and the 'target' identifier with its value, the target value (such as '_blank')). The client has been pre-programmed to associate the value following any identifier with that identifier, so the four pieces count as two. And, the client will know that 'http://example.com' following 'href' will be the value of 'href'. Therefore, the character data inserted into the stream may look like: '15.follow_popoutlink,1.2,4.href,19:http://example\.com,6.target,6._blank'. It consists of the command, the number of data attributes to associate with the command ('href' and 'target'), the 'href', its value the URL (it could be a URI as well), 'target', and its value (for this example) '_blank'.

Notice that a backslash character has been used to "escape" the dot character in 'example.com'. This tells the client that the dot following the backslash is not a delimiter in the meaning that is is used in '15.follow_popoutlink'. When the client receives the data, the 'WebSocket' 'onmessage' code is called.

This is a program method, more specifically, an event handler, for processing incoming data on the client. This code receives the message stream and parses it, recognizing the special command 'follow_popoutlink' and the following data. Typically, the 'WebSocket' API is used in the JavaScript computer language, so the parsing can be described in JavaScript terms. The incoming data is searched for a following next delimiter (dot character), by using the JavaScript 'indexOf' built-in method. That delimiter marks the end of the number representing the length of the next identifier, such as 'follow_popoutlink' or '_target'. The client code extracts the characters representing the number by starting at the beginning of the current unprocessed stream and getting each character in sequence counting until the dot character.

This can be done in the present embodiment using the value from 'indexOf' and the JavaScript built-in extraction method 'substring'. The client code then gets the number by using the built-in JavaScript method, 'parseInt' on the string data representing the number. Since the dot character also marks the beginning of the identifier, the client code, running in the remoting engine client 560, extracts the whole identifier using the number from 'indexOf' plus one as its starting point and the the number it got from the 'parseInt' call, together with the JavaScript 'substring' method.

Once the client code has the identifier, it checks it against a collection of known valid streamed commands by substituting it as a hash key into a collection of program methods using the JavaScript square-bracket syntax. This collection could be named 'streamedCommands' and the variable holding the command identifier extracted by the parsing of the stream could be named 'streamedCommandName'. Using 'streamedCommands[streamedCommandName]' in a JavaScript conditional block allows us to execute the method if it exists: 'if streamedCommands[streamedCommandName]) {streamedCommands[streamedCommandName](data); }', where 'data' represents an object holding the data to be optionally used by the program method.

In the case of 'follow_popoutlink', the data passed in would be collected by the parsing means just described, with the additional special protocol logic of reading the number immediately following the 'following_popoutlink' command so as to know how many datums to collect in the stream before bundling them into the above 'data' object and passing them to the streamed command method. This bundling could be accomplished by using JavaScript to create an empty object: 'var data={ };'. Then each identifier and its value, as provided by the parsing code, would be stored in this manner: 'data[identifier]=value', where 'identifier' and 'value' are each variables holding, respectively, the result of extracting (via the parse logic) the identifier, such as 'href' and '_target', and its corresponding value.

The client issues a navigation command, which is done in the streamed command method for 'follow_popoutlink', described above. This program method, in the present example, has the signature '(data)' and is passed the 'data' object described above. It accesses the url in its parameter data at 'data.href'. Additionally, this program method, where the client is running as a standard web application, inspects for a value 'data.target'. If it finds that value, it will use the following JavaScript (with additional optional parameters, if desired): 'window.open(data.href, data.target);'

If the value of the 'target' is '_blank', this will cause the web browser to open a new child window web browser window ("child window") or child web browser tab ("child tab"), depending on the user's specific configuration of their web browser. A child (window or tab), when created, is accessible only by the parent (window or tab), and can be controlled from the parent. The parent may set references and values in the child. Otherwise, the child has the same characteristics as the parent. The specific behavior of the web browser depends on the specification of the 'window.open' method, a definition of which is provided at commonly-known online reference sources. But in all subcases of this scenario, the resulting child window would be Top-level Web Container 565.

The child window, child tab, HTML frame, and HTML iframe function as descendants (children at the first level of descendancy) of the parent web browser window. Thus, the parent web browser window must exist before its children can exist, and it creates them if necessary.

If the client code does not find a 'data' property 'target', then the current top-level 'window' container, Top-level Web Container 565, can be filled with the desired content with the following JavaScript command: 'document.location.href=data.href'. This command causes the top-level user-interface container that directly hosts the remoting engine client 560 to load itself entirely with fresh content.

A pop-out links-enabled system may additionally support loading a resource indicated by a pop-out link into a portion of the current top-level 'window' container, Top-Level Web Container 565, that is termed an HTML iframe element. An HTML iframe element is a child of the current top-level 'window' container just as a child window is. This action would be specified by a command conforming to a pattern that both the client and server would be programmed to handle. In the preferred embodiment, this would be as a custom HTML attribute, since that would be most easily ignored under local mode. For example, the custom HTML attribute could be 'targetiframe' for target iframe. A preferred embodiment would follow the same rules for target iframes as for target web browser windows and web browser tabs. If the target iframe exists, then it is used; otherwise, a new one is created and referenced by the value of 'targetiframe'. The target iframe creation, referencing and loading code is well known to those skilled in the art. Lastly, the remaining operations on target iframes needed to support pop-out link functionality are the same as for child windows and child tabs. While HTML frames (as distinguished from inline frames, iframes) cannot be created on the fly, they can be targeted by the parent window in the same manner as described above for iframes.

In the case of the pop-out link-initiated redirection described, this would often (but not necessarily) be a new session with a different remote server (like Remote Desktop/Remote Application Window/Remote Graphical Window Engine 535 on a different Server Computer 505) as illustrated in FIG. 5. Upon the successful loading of the new content (in either the 'href=' scenario or the 'window.open' scenario), the client Web Browser/Web Content Viewport 550 now has a direct connection to the desired resource, instead of the unnecessarily mediated and "nested" one as conventionally implemented.

In another embodiment, more than one client (either more than one Web Browser/Web Content Viewport 550 or more than one Client Computer 545 and more than one Web Browser/Web Content Viewport 550) can use a single computer or virtual machine that is hosting multiple remote desktops and/or multiple remote application windows and/or multiple remote graphical windowing user sessions 510 (with not all being sent to the same client). The desktops and/or application windows and/or graphical windowing user sessions 510 being sent to the client 560 must specially mark the redirection request that they send to the remoting engine 535. If they do not, then there is no way to guarantee that the client that should receive the pop-out link navigation directive will be so redirected. To provide this information, a mechanism must be added that enables all the remote desktops/sessions to tell which streaming tunnel of the remoting engine they are connected to.

Such an embodiment consists of a VNC desktop/application window(s)/graphical windowing user session(s) (Requested Application 510) running on the remote computer or remote virtual machine, Server Computer 505. Under VNC, the VNC display number is available as an environment variable for all processes running in that VNC desktop/application window(s)/graphical windowing user session(s) (also termed a "VNC session") locally on the remote computer/virtual machine. Also, the remoting engine 535 holds the VNC listening port number of all current clients (the Web Browser/Web Content Viewports 550 used by the end users to view the remote desktops/remote application windows/remote graphical windowing user sessions) as well as the addresses of those VNC sessions running locally on the remote computer/virtual machine to capture and transmit the state of Requested Application 510.

Additionally, the VNC listening port number is related to its display number. For example, on a given remote computer/virtual machine, port 5901 can be mapped to display number ":1", and port 5902 mapped to ":2", etc.

The VNC display number can be sent as an HTTP 'GET' string-encoded parameter to the 'curl' program (described above), thereby including the necessary additional datum to the remoting engine 535. The application containing the document or other content holding the pop-out link clicked on by the user in the present example knows, as described above, the current VNC display number from an environment variable, typically on Unix and Linux systems '$DISPLAY'. Therefore, it can add the current VNC display number to its parameters to the 'curl' program in the same manner as described above, but with the additional parameter.

In this embodiment, the string form of the HTTP 'GET' request (holding the data from Pop-out Link Navigation Event Data 530) would be, in url-encoded format: 'http://localhost:8080/handlepopoutlink?href=http%3A%2F%2Fexample.com&target=_blank&vnc_num=%3A1'. Then, the 'curl' program can make an HTTP 'GET' request from that string. Notice the identifier near the end of this character string, 'vnc_num'. 'vnc_num' is a proper HTTP 'GET' parameter in an HTTP parameter and value pair since it is preceded by the character '&' and followed by the character '=', with the value following the '=' character being its assigned value. This identifier, in the syntax described, enables the servlet that receives this HTTP 'GET' request to get the VNC display number (in url-unencoded form) ':1'.

From there, the streaming tunnel of the client 560 listening on port 5901 (following the mapping described above (here, ':1' to '5901') can be determined. Since the remoting engine 535 must track which port goes with which streaming tunnel (with each streaming tunnel going to only a single client 560), it can then insert the pop-out link navigation command into the correct stream. The correct client 560 then receives it, and follows it in the same fashion as described above under the single client embodiment.

That which is claimed is:

1. A server apparatus comprising at least one processor configured to run a Remoting Engine hosting a remote graphical computer desktop, remote graphical application window, or remote graphical windowing user session, the at least one processor configured to perform:
   establishing a remote graphical computer desktop, remote graphical application window, or remote graphical windowing user session between the server apparatus and a client computing device configured to run a Remoting Engine client, which utilizes a client web view to request and render content at a given URL or URI, wherein the established remote graphical computer desktop, remote graphical application window, or remote graphical windowing user session is displayed to a user within a top level container of the client web view;
   receiving a navigation action on a navigational link, which includes a destination URL path or URI path, by the client browsing the established remote graphical computer desktop, remote graphical application window, or remote graphical windowing user session;
   in response to the navigation action:
      parsing, by a processor, navigation event data, including a URL or URI, from the navigational link;
      passing, by a processor, the navigation event data to the Remoting Engine hosting the remote graphical desktop, remote graphical application window, or remote graphical windowing user session;
      sending, by a processor, over a network, a navigation command to the Remoting Engine client running on the client computing device to reload the top level container of the client web view with content provided at the destination URL or URI.

2. The server apparatus of claim 1, wherein the destination of the navigational link provides a remote graphical computer desktop, remote graphical application window, or remote graphical windowing user session.

3. The server apparatus of claim 1, wherein when hosting multiple remote graphical computer desktops and/or multiple remote graphical application windows and/or multiple remote graphical windowing user sessions, a message sent to the Remoting Engine to reload the client web view's top level container specifies a network port number for correct remote desktop, remote application windows, or remote graphical windowing user session.

4. The server apparatus of claim 1, wherein the client web view is directed to reload a whole web page context into a child of a top level client container, leaving the top level client container unaltered by the navigation action.

5. The server apparatus of claim 4, wherein the child of the top level client container is newly created.

6. The server apparatus of claim 4, wherein the child of the top level client container is preexisting.

7. A server apparatus comprising at least one processor configured to run a Remoting Engine hosting a remote graphical computer desktop, remote graphical application window, or remote graphical windowing user session, the at least one processor configured to perform:
   establishing a remote graphical computer desktop, remote graphical application window, or remote graphical windowing user session between the server apparatus and a client computing device configured to run a Remoting Engine client, which utilizes a client web browser to request and render content at a given URL or URI, wherein the established remote graphical computer desktop, remote graphical application window, or remote graphical windowing user session is displayed to a user within a top level container of the client web browser;
   upon a navigation action on a navigational link, which includes a destination URL path or URI path, by the client browsing the established remote graphical computer desktop, remote graphical application window, or remote graphical windowing user session:
      parsing, by a processor, navigation event data, including a URL or URI, from the navigational link;
      passing, by a processor, the navigation event data to the Remoting Engine hosting the remote graphical desktop, remote graphical application window, or remote graphical windowing user session;
      sending, by a processor, over a network, a navigation command to the Remoting Engine client running on the client computing device to reload the top level container of the client web browser with content provided at the destination URL or URI.

8. The server apparatus of claim 7, wherein the destination of the navigational link provides a remote graphical computer desktop, remote graphical application window, or remote graphical windowing user session.

9. The server apparatus of claim 7, wherein when hosting multiple remote graphical computer desktops and/or multiple remote graphical application windows and/or multiple remote graphical windowing user sessions, a message sent to the Remoting Engine to reload the client web browser's top level container specifies a network port number for correct remote desktop, remote application windows, or remote graphical windowing user session.

10. The server apparatus of claim 7, wherein the client web browser is directed to reload a whole web page context into a child of a top level client container, leaving the top level client container unaltered by the navigation action.

11. The server apparatus of claim 10, wherein the child of the top level client container is newly created.

12. The server apparatus of claim 10, wherein the child of the top level client container is preexisting.

13. The server apparatus of claim 10, wherein the child of the top level client container is an HTML frame.

14. The server apparatus of claim 10, wherein the child of the top level client container is a browser window or tab.

15. A client apparatus comprising at least one processor configured to run a Remoting Engine client to access a remote graphical computer desktop, remote graphical application window, or remote graphical windowing user session, which utilizes a client web view to request and render content at a given URL or URI, the at least one processor configured to perform:
   establishing a remote graphical computer desktop, remote graphical application window, or remote graphical windowing user session between the client apparatus and a server computing device configured to run a Remoting Engine, wherein the established remote graphical computer desktop, remote graphical application window, or remote graphical windowing user session is displayed to a user within a top level container of the client web view;
   performing a navigation action on a navigational link, which includes a destination URL path or URI path, on the established remote graphical computer desktop, remote graphical application window, or remote graphical windowing user session;
   receiving, over a network, a navigation command to the Remoting Engine client running on the client apparatus to reload the top level container of the client web view with content provided at the destination URL or URI.

16. The client apparatus of claim 15, wherein the destination of the navigational link provides a remote graphical computer desktop, remote graphical application window, or remote graphical windowing user session.

17. The client apparatus of claim 15, wherein the client web view is directed to reload a whole web page context into a child of a top level client container, leaving the top level client container unaltered by the navigation action.

18. The client apparatus of claim 17, wherein the child of the top level client container is newly created.

19. The client apparatus of claim 17, wherein the child of the top level client container is preexisting.

\* \* \* \* \*